July 16, 1929.     G. O. LEE     1,721,456
REVERSIBLE PLOW
Filed Feb. 18, 1927     3 Sheets-Sheet 1
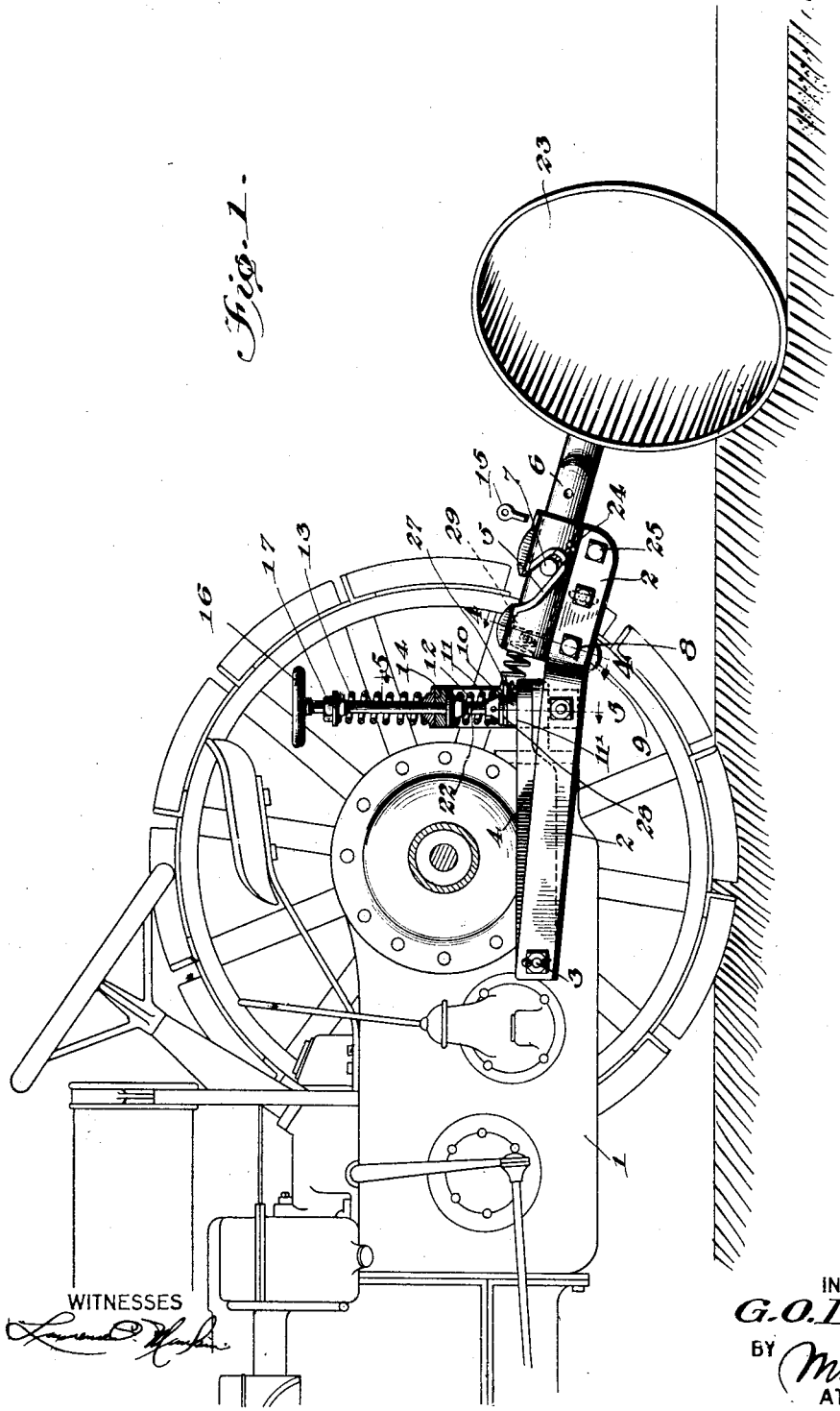
INVENTOR
G. O. Lee,

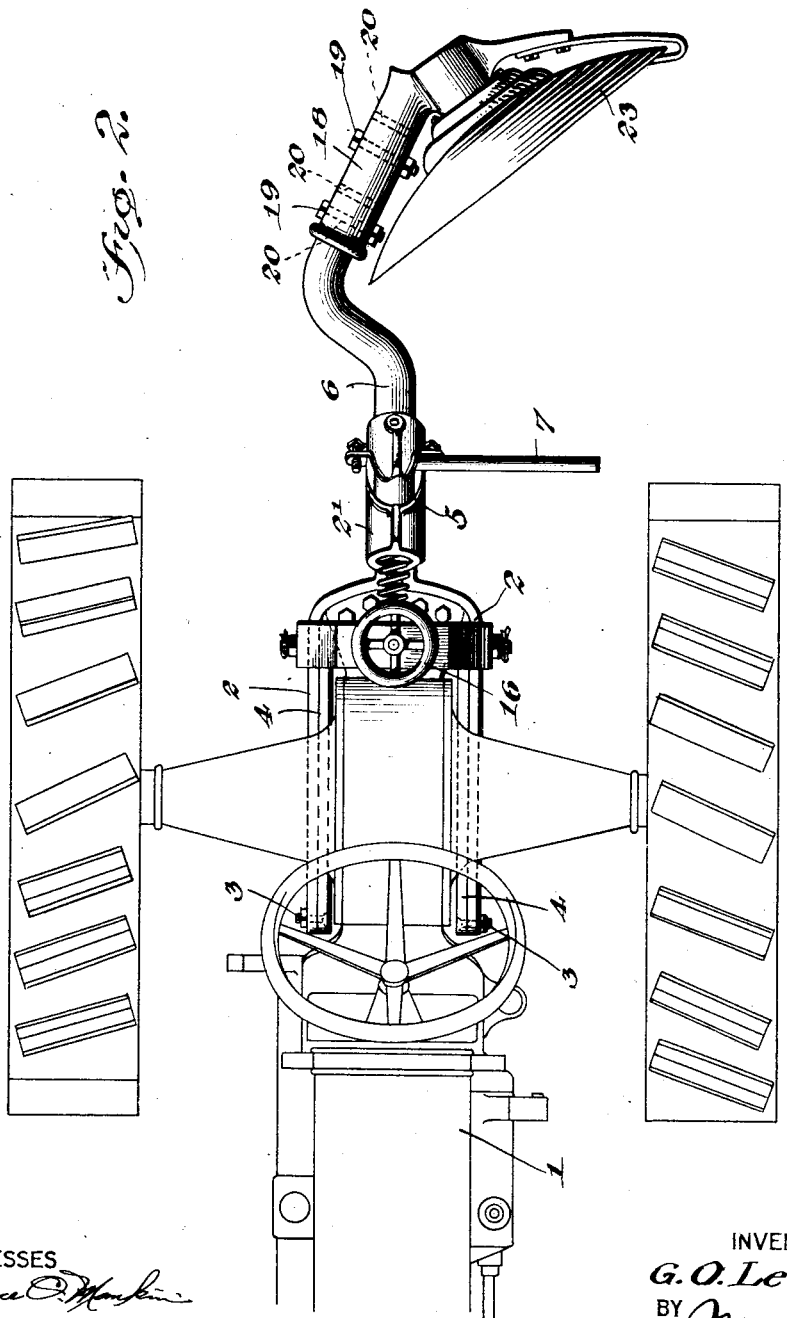

July 16, 1929. G. O. LEE 1,721,456
REVERSIBLE PLOW
Filed Feb. 18, 1927 3 Sheets-Sheet 3
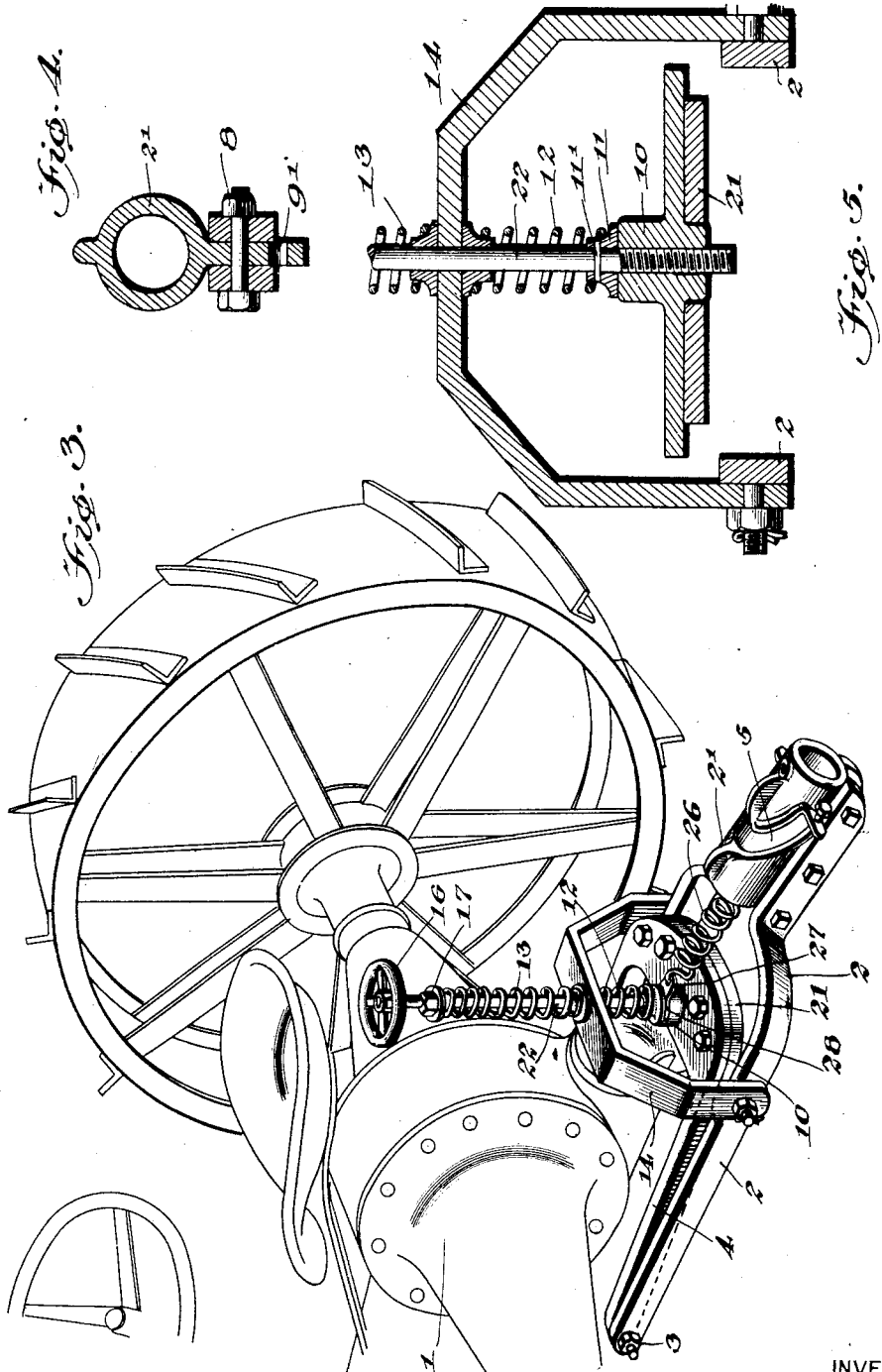

Patented July 16, 1929.

1,721,456

UNITED STATES PATENT OFFICE.

GARNETT O. LEE, OF LYNCHBURG, VIRGINIA.

REVERSIBLE PLOW.

Application filed February 18, 1927. Serial No. 169,277.

This invention relates to an improvement in reversible plows for use on tractors and of the general type of that forming the subject matter of my prior Patent No. 1,546,844, granted July 21, 1925.

The object of the invention is to provide a reversible plow having all of the advantages and capacities of that forming the subject matter of my prior patent hereinabove referred to and which in addition is simpler in construction, more positive in its action, more readily controllable and better adapted to take a relatively wide cut.

A further object is to provide a novel means for controlling the depth of cut in either position of the plow.

Another object is to provide improved means for regulating the pitch or angle of inclination of the disc or plow.

Other objects and advantages reside in certain novel features of the construction, arrangement and combination of parts which will be hereinafter more fully described and particularly pointed out in the appended claims, reference being had to the accompanying drawings forming a part of this specification, and in which, In the drawings, Figure 1 is a perspective view showing the invention and the means for attaching the same to a tractor, Figure 2 is a top plan view of the same, Figure 3 is a perspective view showing the plow carrier attached to the draw-bar of the tractor, Figure 4 is a section on the line 4—4 of Figure 1, and Figure 5 is a section on the line 5—5 of Figure 1.

Referring more particularly to the drawings, reference numeral 1 designates the tractor to which the invention is attached, 2 representing the plow carrier which may be formed of three parts, two side arms, and a bearing member into which a shaft 6 carrying the plow 23 operates. The carrier 2 is secured to bracket 4 by any desired means such as, for example, the pivot 3. The bracket 4 is secured by bolts to the draw-bar 21 of the tractor. The carrier 2, as previously mentioned comprises a bearing portion, indicated by 2' in which the shaft 6 carrying the plow 23 is adapted to rotate, or oscillate, and at the same time is adapted to move longitudinally to a limited extent. The bearing member 2 is provided with an arcuate slot 5 which is adapted to receive the member 7, such as a lever or the like, which member 7 serves as a means for reversing the plow 23. Secured to the carrier 2 is a member 14, which may be regarded as a bracket. This member 14 is perforated to receive the screw 22. This screw 22 is secured to member 10 which serves to raise and lower the plow. This member 10 is integral with the bracket 4. Between the bracket 14 and the member 10, there is placed the spring 12, which spring serves as a shock absorber to cushion the shocks of the plow upon the tractor when the plow is out of the ground. Resting upon the bracket 14 and under tension by the nut 17 is the spring 13, which spring serves to retain the plow in the ground and to prevent the plow from jumping when it strikes obstacles during the operation. Screw 22 is adjusted by means of the head 16. Member 11, Figure 1, designates a spring seat upon which spring 12 rests, the shaft 22 being fastened therein by means of pin 11'. The portion 2' of the plow carrier is movably adjusted in the side arms 2, and is provided with a projection 9 at the forward end of the bearing member 2', said projection 9 being provided with a hole 9' which is adapted to fit over the bolt 8, in order to adjust the angle of depression of the plow. In order to accomplish this adjustment, bolt 8 is removed from its seat, and the member 2' is raised upon pivot 25 until the opening 9 corresponds with the opening through the side arm 2 through which the bolt 8 was previously fixed. The bolt is then reinserted through its opening and through the opening 9' registering therewith, the angle of depression of the plow 23 being thereby increased. When it is desired to transport the plow from one place to another, the plow may be turned to a neutral position by means of member 7 and locked in this position by means of pin 15 which fits in an opening in member 2' and an opening in shaft 6 registering with the opening in 2'.

As will be seen from Figure 2 the shaft 6 carries a member 18 upon which the plow 23 is directly mounted, member 18 fitting over the shaft 6 and being secured to the same by means of bolts 19 fitted through appropriate openings in member 18 and shaft 6. Additional openings 20 are provided in the member 18 and shaft 6 through which bolts 19 may be inserted if desired, this means compensating for the wear upon the surface of the plow 23 and to make a narrower furrow.

The operation of the device is indicated by the above description. It is to be understood that the slot 5 always assumes the position shown in Figures 1 and 3, the sleeve member 2', in which the slot is formed, being fixed. The shaft 6 is snugly fit in the sleeve portion 2', being free to rotate and to oscillate in said sleeve portion during the operation of the lever 7. If it is desired to reverse the position of the plow 23, the tractor is backed and this permits the lever 7 to slide up in the slot 5, permitting this lever 7 to be grasped and turned over. In order to facilitate the turning over and reversal of the plow 23 provision is made of a retractile spring 26 which is provided with loops. The uppermost end of these loops engages the eyes 27 of a washer 28 assembled upon the screw shaft 22. The lowermost loop engages the eye 29 suitably applied upon the free end of the shaft 6. It can be seen at once that the effort of the lever 7 in the slot 5 in turning the plow over from one position to another is readily relieved by the function of the spring.

When the plowing operation is begun, the member 7 slips down into the lower part of the slot and is held firmly therein. The set screw 24 determines the position at which the member 7 rests, the cut of the plow being thereby regulated.

The member 4 is secured to the draw-bar 21 as previously mentioned. The member 4, which is in the shape of a bracket is brought forwardly and under the rear axle of the tractor, and the side arms 2 of the plow carrier are secured to these arms 4 at such a point that the upward component of the pull of the plow is neutralized, the front wheels of the tractor being thereby held firmly in contact with the ground.

While the construction and arrangement of the improved reversible plow is that of a generally preferred form, obviously modifications and changes may be made without departing from the spirit of the invention or the scope of the claims.

I claim:

1. A device of the character described comprising a bracket attachable to a vehicle, a plow carrier hingedly mounted to the bracket and including a rearward extension, a bearing sleeve fixed in said rearward extension and having an arcuate slot, a plow shaft snugly fitted in said bearing sleeve, said plow shaft carrying a plow, a lever attached to the shaft and projecting from said sleeve at said slot for rotation and endwise movement of the shaft upon operation of the lever in said slot thereby to reverse the plow, means mounted upon the bracket to sustain the carrier in desired positions, and a retractile spring connected between said sustaining means and said shaft for assisting in the action of the lever and said shaft in reversing the plow.

2. In a plow, a horizontally disposed bracket, a plow carrier pivotally attached thereto for movement about a horizontal axis, means for attaching an earth working element to the free end thereof, a vertical yoke attached to the plow carrier and overlying the bracket, a screw having threaded engagement with the bracket and passing loosely through the yoke, and opposed expansible coil springs encircling the screw and bearing against the yoke whereby to cushion the plow carrier, the springs further serving as operative connections between the screw and yoke whereby to raise and lower the latter to vary the angle of the plow carrier upon operation of the screw.

3. In a plow, a horizontally disposed bracket for attachment to a plow, a plow carrier pivotally attached thereto for movement about a horizontal axis and adapted to receive and support an earth working element, a yoke extending vertically from the plow carrier and overlying the bracket, a vertically disposed adjusting screw having threaded engagement with the bracket and a yieldable connection between the yoke and screw whereby to raise and lower the plow carrier and thereby govern the position of the earth working element with respect to the ground, the yieldable connection also serving to cushion the movement of the plow carrier.

GARNETT O. LEE.